July 24, 1956
R. ASHTON
2,755,912
HARVESTING MECHANISM
Filed Aug. 8, 1952
2 Sheets-Sheet 1
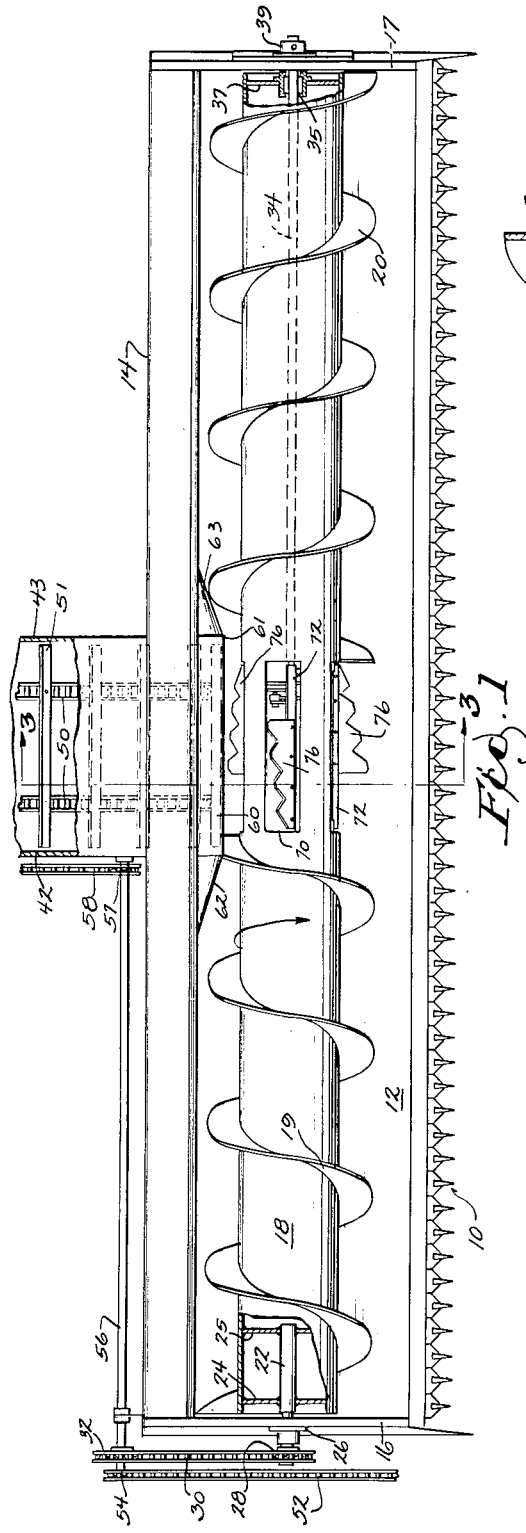
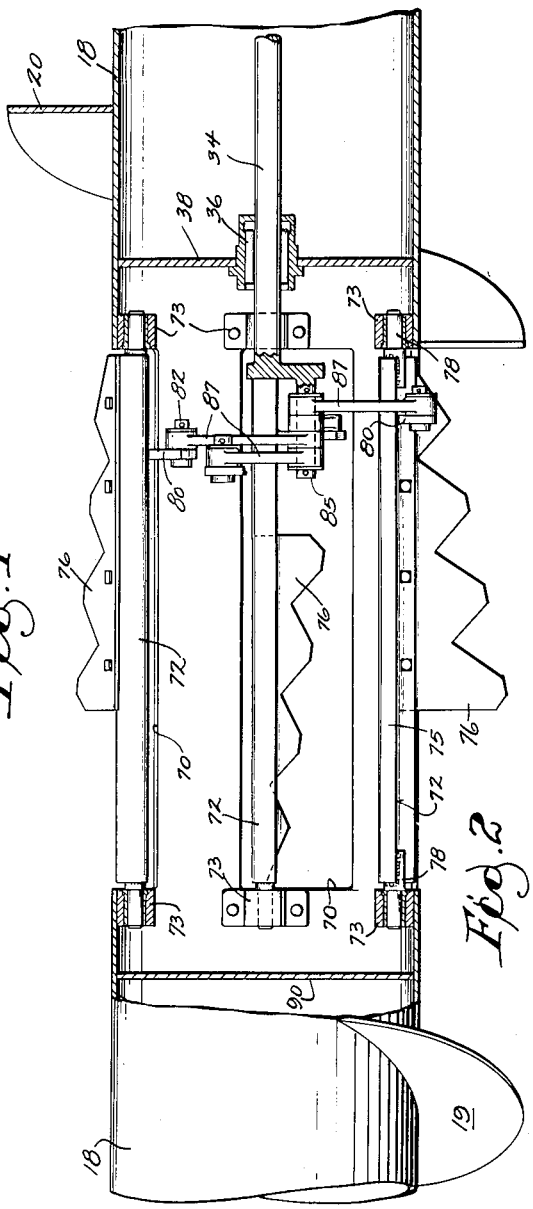
INVENTOR.
ROBERT ASHTON
BY James E. Nilles
ATTORNEY

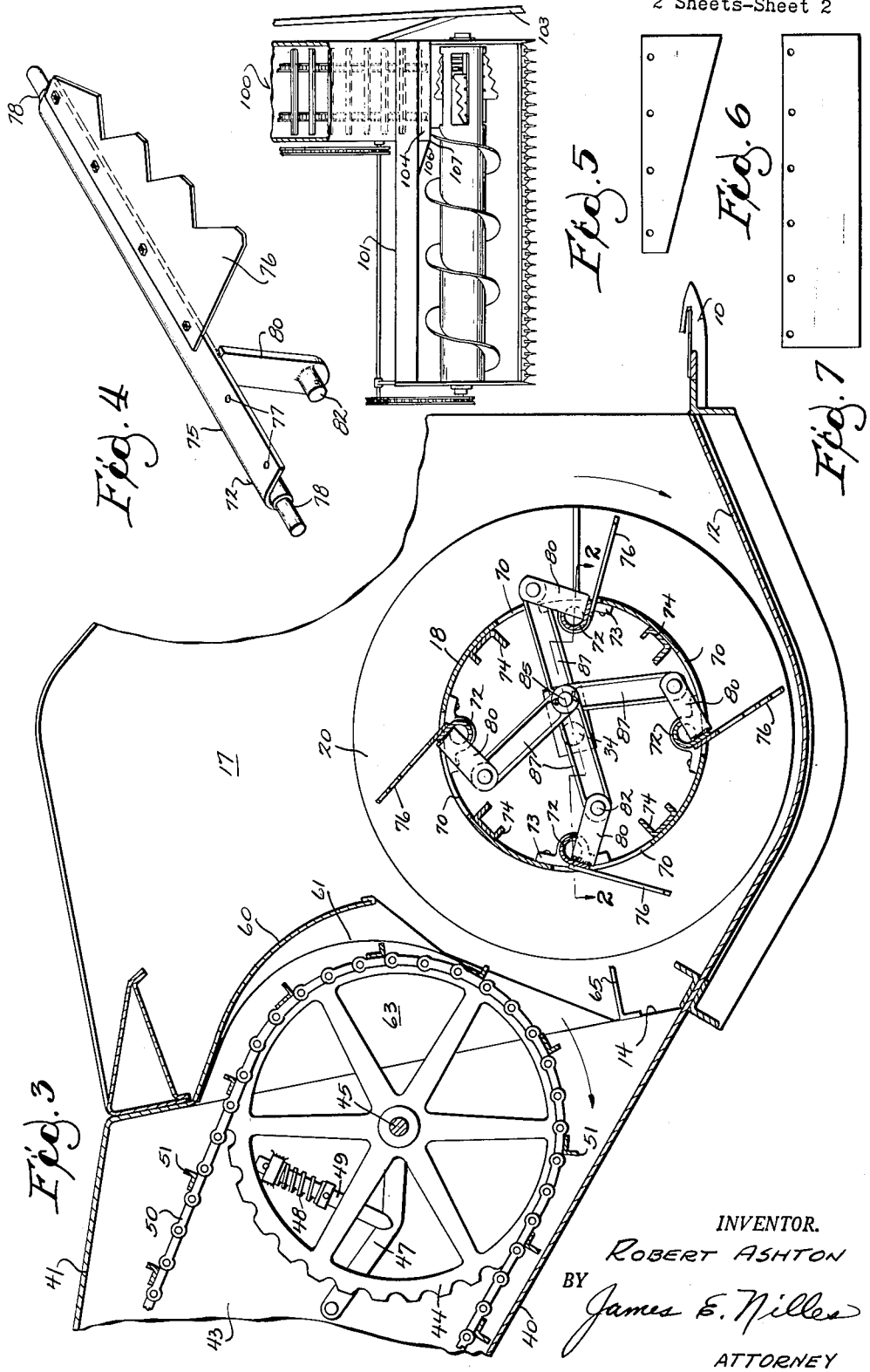

United States Patent Office 2,755,912
Patented July 24, 1956

2,755,912

HARVESTING MECHANISM

Robert Ashton, Toronto, Ontario, Canada, assignor to Massey-Harris-Ferguson Limited, a corporation of Canada Application August 8, 1952, Serial No. 303,321

1 Claim. (Cl. 198—104)

This invention relates generally to the harvesting section of an agricultural machine such as a combine, forage harvester or similar machine and more particularly to that type of machine which has part of the harvester section extending laterally to one or both sides in the form of a helical screw conveyor, more commonly referred to as an auger tube, for conveying the crop material laterally inwardly toward a relatively narrow, rearwardly moving elevator. This invention relates more particularly to a feeding mechanism located in the harvesting section just forward of the general area where the laterally moving crop material changes direction and is then moved rearwardly into the elevator.

This invention is an improvement over U. S. Patent #2,426,922, issued to T. Carroll on September 2, 1947, and entitled Auger Conveyor For Combine, wherein the harvesting section comprises a rotatable auger tube having an auger flight on either end and a central portion comprised of stationary blades. While the fixed blade feeder disclosed in this patent did do a satisfactory job as far as keeping the trough clean, that is, as far as sweeping the center part of the trough and the material thereon into the undershot elevator, it did have a tendency to wrap or wind the material around the tube under extreme conditions.

It is known in the art to provide retractable fingers in the central portion of the auger tube which retract when they are immediately in front of the opening in the rear wall of the auger trough and extend during the forward part of their travel to effectively push the grain which is cut in front of the fingered section under the auger tube and into the rear wall opening. Such an arrangement is disclosed in U. S. Patent #2,529,180, issued to A. W. Oehler on November 7, 1950.

However, with a device such as disclosed in the Oehler patent, there arises a serious problem of maintenance of such a feeder due to breakage of the fingers, especially when operating in stony territory. When these fingers bend or break in picking up an obstruction, in some instances they will tear the crank and bushings on which they are mounted or damage the tube in which they rotate. Occasionally, these broken pieces will find their way into the threshing cylinder and obviously cause a great deal of damage. It has been proposed to weaken these fingers in a certain location along their length so as to cause a breaking at a definite point when an obstruction was encountered which would prevent injury to the tube and crank shaft. It has also been proposed to threadibly engage these fingers into their mounting so as to be easily replaceable. The bushings themselves through which these fingers reciprocate in the auger tube are somewhat complicated, consist of quite a few number of parts and are costly to manufacture, install and replace. They also present a problem of lubrication and it has been proposed to make the numerous bushings of various material such as rubber or Bakelite which has been impregnated with graphite. These fingers are also objectionable from a cost standpoint as it can be readily seen that such a feeder involves a very large number of parts many of which require accurate machining such as the bushings, bushing mountings, the mounting of the crank, and the crank itself. Another serious objection to the retractable finger feed is the aggravating noise these fingers make while extending and retracting through the tube when in operation. It will be appreciated that the operator of the combine seriously objects to this continual scraping and rattling noise throughout the day. These are just a few of the problems encountered in the use of these fingers in this particular area. They have, however, provided a very satisfactory device to prevent winding of the tangled material on this section of the tube, i. e., to prevent any carryover of material in the wrong direction and in offering no obstruction to the laterally incoming material behind the tube.

It is, therefore, an object of this invention to overcome the objections and the shortcomings of the prior art devices.

It is an object of this invention to provide a feeding device in the harvesting section of such a machine which will effectively feed the material cut in front of the elevator housing rearwardly under the tube and into the housing along with the grain moved in from the sides, and prevent winding of the heavy, tangled material around the tube at this particular location; and, at the same time, offer no obstruction to the laterally incoming grain in the rear of the auger tube.

It is an object of this invention to provide a feeder device, the original cost of which is much less than prior art structures; which will require less upkeep and maintenance and is much more simple in operation and construction than prior art structures and is very quiet and efficient in operation.

It is an object of this invention to provide a feeding device whose crop engaging members may be readily interchanged with a minimum of effort and machine down time in order to most efficiently harvest crops of varying types, conditions of stand and yields.

The advantages inherent in the above stated objects and other advantages will become readily apparent as this disclosure progresses and particularly points out the various features of this invention. Accordingly, the present invention may be considered as comprising the various constructions, combinations or sub-combinations of parts as is hereinafter more fully set forth in the detailed description and in the claim, reference being had to the accompanying drawings in which:

Figure 1 is a plan view of the harvester section wherein the material is moved in laterally from both sides of the table such as is found on a combine of the self propelled type.

Figure 2 is a plan view on an enlarged scale, partially in section, taken on line 2—2 of Figure 3, of the central feeding portion of the auger tube.

Figure 3 is a right side elevational view on an enlarged scale, in section taken on line 3—3 of Figure 1.

Figure 4 is a detail view, on an enlarged scale, showing the sweeper blade, the bar to which it is mounted, and its arm.

Figure 5 is a plan view showing the invention as used where the material is moved in laterally from only one side of the table such as is found on a pull type combine.

Figure 6 is a detail view, on an enlarged scale, of a blade similar to the blade of Figure 4 without the serrations.

Figure 7 is a detail view, on an enlarged scale, of another blade modification.

Referring more particularly to Figure 1, the harvesting section has operatively secured along its forward edge the conventional cutting mechanism 10 comprising the usual sickle bar and guards. The platform table comprises an arcuate bottom wall 12, a substantially vertical rear wall 14, and end walls 16 and 17. A one piece tubular shaft 18 is rotatably mounted in the end walls 16, 17 of the table and has extending from either end a helical auger screw 19 and 20, each inner end of which terminates adjacent an opening in the rear wall 14. The tubular shaft 18 is mounted and driven at one end by means of a stub shaft 22 which is rigidly secured to the tubular shaft by inner support plates 24, 25 and extends through the end wall 16 in a suitable bearing 26 and has at its protruding end a sprocket 28 which is driven by a chain 30. The other end of the auger shaft 18 is rotatably mounted on a control shaft 34 by means of bearings 35, 36 which are supported within the tube in support plates 37, 38 respectively. The outer end of the control shaft 34 is fixedly mounted in the end wall 17 by means of a bearing 39. This control shaft 34 may be rotatably adjusted for purposes that will hereinafter appear by means (not shown) of a locking arm which is secured at one end to the shaft 34 and capable of being secured at the other end to the wall 17 in a plurality of positions.

Extending rearwardly from the table and leading to the threshing portion (not shown) of the combine is an elevator housing (see Fig. 3) which comprises bottom wall or chute 40, a top wall or cover 41, and side walls 42 and 43. Within the elevator housing and protruding through the opening in the rear wall 14 of the table is an elevator of the under shot type. This elevator comprises a pair of large sprocket wheels 44 which are rotatably mounted on a shaft 45 which in turn is mounted on brackets 46, 47 pivotally secured to the side walls 42, 43 of the elevator housing. Shaft 45 is capable of moving vertically to accommodate slugs or varying amounts of crop material. Spring means 48, through rod 49, yieldingly hold the shaft 45 in its lowermost position so as to effectively grasp and feed the material up the chute 40. Adjacent the rear end of the elevator housing is a pair of smaller sprockets which are mounted on a driving shaft (not shown). A pair of chains 50 are trained over the corresponding pairs of large and small sprockets. These chains have spaced along their length, cleats 51 which effectively grasp and convey the crop material.

A conventional reel (not shown) is located above the cutting mechanism 10 and is driven by a chain 52 through a sprocket 54 which, together with sprocket 32, are mounted on a drive shaft 56. The drive shaft 56 in turn derives its power through a sprocket 57 and chain 58 and suitable driving connections to the power plant of the machine.

Above that portion of the undershot elevator that protrudes through the opening in the rear wall of the table is a hood 60. In Figure 3 it can be seen that this hood extends downwardly and forwardly over the forward end of the elevator. In using an undershot elevator of this type in certain types of crops and under certain conditions, such as a heavy crop of wet, down and tangled rice or flax, there is a tendency for the crop material to "carry over" on the elevator and ride forwardly on the top of the elevator, spilling out at the front end. The hood 60 that is provided prevents this "carry over" material from dropping on the top of the tube 18 and being caught by the blade which is then on the top of tube and moving forwardly at that point in its rotation, and will not be stripped by the downwardly moving part of the elevator. Rather, the hood forces the "carry over" material down into the mass of converging crop streams being acted on by the elevator and chute. The hood 60 also serves to prevent dust and chaff, which is being spilled out the top of the elevator housing, from blowing back on the operator. At either side of the protruding end of the under shot elevator and secured to the back wall of the auger table are semi-conical shields 62, 63 which are also secured to hood 60 at the base of the cones 61. These semi-conical shields, or cones, are so shaped so as to fully shield the protruding sides of the undershot elevator from the laterally, inwardly moving grain regardless of the vertical position of the floating forward end of the elevator. This arrangement is particularly effective in feeding the mass of incoming material at only the most efficient point on the elevator. Also secured along the back wall of the auger table and somewhat beneath the forward end of the elevator is a cut off bar 65 which prevents the laterally inwardly moving grain from being carried over the rotating auger tube.

In operation, as the machine advances through the field, the crop material that is cut directly in front of either auger screw is carried under the tube and rearwardly along the back wall of the trough and against the cut-off bar 65. In other words, the great majority of the crop which is cut at either side of the platform is carried along the rear wall of the table and behind the auger conveyor. As it approaches the central portion of the table, the cones 62, 63 prevent the laterally moving grain from being entangled in the sides of the protruding under shot elevator. The crop material that is cut directly in front of the elevator housing or, in other words, in front of that portion of the auger tube which does not contain the helical screws, must be immediately swept under the auger tube and fed directly into the under shot elevator, merging with the laterally inwardly moving grain in a zone substantially behind the auger tube and immediately in front of the protruding portion of the elevator.

In accordance with this invention there is provided on that portion of the auger tube between the helical screws 19, 20, a series of blades 76 which are oscillatingly mounted at circumferentially spaced locations adjacent the periphery of the tube. The tube across its entire length is of one piece construction so as to offer no impediment to the flow of material. In the embodiment shown there is provided a series of elongated openings 70 in the tube adjacent which I rotatably mount a bar 72 in bearing brackets 73 which are riveted or bolted within the tube. Reinforcing channels 74 are secured to the inner surface of the tube 18 adjacent each opening 70. It is important to keep the design of the tube as clean and free from obstructions as possible in this area so as to eliminate any opportunity for the material to catch on any projections and thus wrap or wind on the tube. Therefore, I prefer to use flat headed rivets or bolts in securing the bearing brackets 73 to the tube. In order to reduce the weight of the bar 72 and give it sufficient strength as well as providing a means for fastening various shaped replaceable blades thereon, I prefer to construct the bar as shown. The larger portion 75 of the bar is fabricated from a piece of sheet steel into a generally U-shaped cross section as shown and has along its length a plurality of holes 77 for the reception of bolts with which to secure the various shaped sweeper blades. At either end of member 75 are welded stub shafts 78 which are rotatably mounted in the brackets 73. A control arm 80 is welded to the member 75 adjacent one end thereof and has welded to its free end a pin 82. The fixed control shaft 34 has at its inner end a control crank or eccentric 85. As previously stated, this eccentric or control crank may be adjustably secured in any position from the outside end of the control shaft 34 in order that the location at which the blades will assume a radial or tangential position can be varied for greatest efficiency. Also, due to inaccuracies in the production of the various component parts it is desirable to be able to adjust the crank 85 in order that the blades assume a proper position, relative to the bottom wall 12 of the trough for maximum efficiency in keeping the trough swept clean. Levers 87 operatively connect each arm 80 with the control crank 85. As shown in Figure 3 the control crank is positioned so that the blades assume a radial position with respect to the tube at a point directly in front of the tube and are positioned substantially tangential to the tube, in other words, rearwardly inclined in respect to the direction of tube rotation, in the zone of congestion which, as previously described, is where the laterally inwardly moving grain converges with the crop material that is cut directly in front of the elevator.

In Figure 5 I have shown this invention as it pertains to a "pull type" machine wherein the crop material is fed into the undershot elevator 100 which is located at one end of the table 101, the whole machine being pulled by a tractor through a conventional hitch 103. A hood 104, similar to hood 60 of Figure 3, extends over elevator 100. However, this embodiment requires only one semi-conical shield 106 which is secured to hood 104 by its base 107.

In operation, the blades prevent any bunching of the material in front of the tube by immediately forcing it under the tube. The blades also keep the central portion of the trough free of loose grain or dirt by effectively sweeping the material into the elevator. It has been found in practice that a more even flow of material is delivered to the elevator by alternating the larger end of the blades across the opening. Depending on the crop conditions and the type of crop being harvested, various shaped blades may be easily interchanged. As the inwardly moving grain and rearwardly moving grain merge in the zone of congestion the blade "pulls out" of the mass of material by assuming a substantially tangential position with respect to the tube, and in cooperation with the downwardly moving portion of the undershot elevator the crop material is prevented from being carried forwardly over the tube and is uniformly and positively, without hesitation, forced up the chute.

It can now be seen that I have provided a feeding mechanism which prevents bunching of the material ahead of the tube, keeps the trough in a clean condition, offers no obstacle to the grain moving in from the side, prevents any winding or carry-over on the tube and in cooperation with the undershot elevator efficiently and positively feeds the merging crop streams rearwardly to the threshing portion of the machine, or, for example in the case of an ensilage harvester, to the chopping cylinder.

A convenient means has also been provided for changing the size and shape of the blades to efficiently accommodate the various crops and conditions of stand. In Figure 7 I have shown a blade which is of constant width across the entire feeder portion which would be used in harvesting special crops without foliage or crops that are so short that it is necessary to cut so close to the ground that dirt is picked up. This blade is called a "short grain attachment" and it is used to keep this dirt, which is dug up by the auger table, swept out of the bottom of the auger trough. This dirt cannot be swept out by a finger feed and if left to accumulate will pile up to a point where it will interfere with the feeding into the undershot elevator. This particular sweeper blade is used primarily on machines in the Northwest where a very short crop is cut and which has been sown usually by deep furrow drills, and the condition of the ground is such that there is a tendency for the auger table to pick up quite a percentage of dirt which can only be kept clean by the use of the sweepers.

It will now be appreciated that I have provided a feeding mechanism for a harvester the maintenance of which is relatively simple, the original cost of which is much less than prior art devices, is much easier to assemble, repair and adjust and is simple and quiet in operation.

Obviously many minor changes in detail may be made and still fall within the scope of this invention and appended claim. For instance, the openings in the tube could be made narrower by changing the shape of the control arm 80. That is, it would not be necessary for the lever 87 to protrude beyond the periphery of the tube. However, in practice it has been found that the protruding lever is of no consequence because its protrusion is at the forward side of the tube and offers no obstruction to the laterally and inwardly moving grain. There is no tendency for the tube to become full of crop material or foreign matter as the openings are large enough to expel the material as rapidly as it enters and inner support plates 90 and 38 keep the material confined to the central portion of the tube. Furthermore, the larger openings facilitate the lubrication of the various bearings and are advantageous from that standpoint.

Having thus shown and described this invention, I claim:

In combination, a one piece tubular rotatable supporting shaft, a pair of helical auger screws oppositely wound on said shaft and having their adjacent ends terminating in axially spaced relation, the portion of said shaft between said ends having a plurality of circumferentially spaced elongated openings therein and also having a bar pivotally mounted on the inner side of said tubular shaft adjacent each opening, said bar including a member having a generally "U" shaped cross section and also having a plurality of holes along the length thereof, a crop engaging rigid blade rigidly and detachably secured directly to each of said members and extending through its respective opening, an eccentric shaft mounted within said tubular shaft, means interconnecting said eccentric shaft and said members and responsive to rotation of said shaft for positively oscillating said blades between a rearwardly inclined and a substantially radial position with respect to said shaft, said openings being large enough to preclude crop material from collecting within said tube.

References Cited in the file of this patent

UNITED STATES PATENTS

| | | |
|---|---|---|
| 1,409,695 | French | Mar. 14, 1922 |
| 2,497,409 | Jones | Feb. 14, 1950 |
| 2,608,283 | Oehler | Aug. 26, 1952 |
| 2,612,980 | Oehler | Oct. 7, 1952 |
| 2,644,284 | Oberholtz et al. | July 7, 1953 |
| 2,682,948 | Millard et al. | July 6, 1954 |
| 2,717,690 | Dukelow | Sept. 13, 1955 |

FOREIGN PATENTS

| | | |
|---|---|---|
| 566,009 | Germany | Dec. 9, 1932 |